United States Patent
Yokoo

(10) Patent No.: US 6,867,689 B2
(45) Date of Patent: Mar. 15, 2005

(54) POWER LINE COMMUNICATION MODERN NOT REQUIRING EXTRA PLUG SOCKET

(75) Inventor: Kenichi Yokoo, Fukushima-ken (JP)

(73) Assignee: Alps Electrtic Co., Ltd., Tokyo (JP)

( * ) Notice: Subject to any disclaimer, the term of this patent is extended or adjusted under 35 U.S.C. 154(b) by 0 days.

(21) Appl. No.: 10/378,804

(22) Filed: Mar. 4, 2003

(65) Prior Publication Data

US 2003/0169157 A1 Sep. 11, 2003

(30) Foreign Application Priority Data

Mar. 5, 2002 (JP) ........................................ 2002-058808

(51) Int. Cl.⁷ .......................................... H04M 11/04
(52) U.S. Cl. ........................... 340/310.06; 340/310.01; 340/310.03; 340/310.08; 340/656; 375/222; 375/227; 375/235; 375/224; 361/118; 361/119
(58) Field of Search ................ 340/310.06, 310.01, 340/310.03, 310.08, 656; 375/222, 227, 235, 224; 361/118, 110

(56) References Cited

U.S. PATENT DOCUMENTS 5,801,635 A * 9/1998 Price ........................... 340/656
6,445,087 B1 * 9/2002 Wang et al. ................... 307/40
6,597,557 B2 * 7/2003 Hunter ........................ 361/118

FOREIGN PATENT DOCUMENTS

| DE | 100 08 602 A1 | 6/2001 |
| DE | 100 08 615 A1 | 9/2001 |
| EP | 1 178 616 A1 | 2/2002 |
| JP | H07-264107 | 10/1995 |
| WO | WO 02/05451 A1 | 1/2002 |

* cited by examiner

Primary Examiner—Daniel Wu
Assistant Examiner—Tai T. Nguyen
(74) Attorney, Agent, or Firm—Brinks Hofer Gilson & Lione

(57) ABSTRACT

A power line communication MODEM includes a MODEM main body portion and a power supply portion for converting an A.C. power source to a D.C. power source and supplying the D.C. power source to the main body portion through a cable. An attachment plug for inputting the A.C. power source and a plug socket connected to the attachment plug are provided to the power supply portion, and a power source is supplied from this plug socket to an information processing unit such as a personal computer.

2 Claims, 3 Drawing Sheets

POWER LINE COMMUNICATION MODERN NOT REQUIRING EXTRA PLUG SOCKET

BACKGROUND OF THE INVENTION

1. Field of the Invention

This invention relates to a power line communication MODEM for transferring data from an information processing unit such as a personal computer through a power line.

2. Description of the Related Art

Power lines include a distribution line for sending power from a substation to each home and an interior distribution line extended inside home. A power line communication MODEM (abbreviated as "PLC MODEM") is a device that makes it possible to use these power lines as a communication line. The PLC MODEM converts digital data from an information processing unit such as a personal computer to analog signals, overlaps the signals with the power line of a commercial power source, converts the analog signals inputted through the power line to the digital signals and sends them to the information processing unit. Therefore, the PLC MODEM can constitute a communication network among the information processing units.

FIG. 5 is a perspective view of a known PLC MODEM. The PLC MODEM 40 includes a power supply portion 41 and a MODEM main body portion 42. The power supply portion 41 has a rectangular outer shape, converts an A.C. commercial power source to a D.C. power source and supplies a D.C. voltage to the MODEM main body portion 42. Therefore, an attachment plug 41a for inputting the A.C. power source is fitted to one of the surfaces of the power supply portion 41, and a rectification circuit 41b is accommodated in the power supply portion 41 (see FIG. 6). The D.C. voltage acquired by the rectification circuit 41b is supplied to the MODEM main body portion 42 through a cable 43.

The MODEM main body portion 42, too, has a rectangular outer shape and incorporates therein a MODEM circuit 42a (see FIG. 6). The MODEM circuit 42a converts the digital signal to the analog signal and vice versa as described above. A connector for exchanging digital data with an information processing unit (not shown) is fitted to one of the side surfaces of the MODEM main body portion 42. The connector to be fitted includes a connector of the USB standard (called "USB connector") 42b and a connector of the Ethernet standard (trade name of XEROX Co., DEC Co. and Intel Co.; hereinafter the same; called "Ethernet connector") 42c.

FIG. 6 shows a block construction of the PLC MODEM 40. The A.C. power source acquired from the attachment plug 41a is converted to the D.C. power source by the rectification circuit 41b and the D.C. voltage is supplied to the MODEM circuit 42a through the cable 43. The attachment plug 41a and the cable 43 are connected to each other by signal overlapping means 41c. The USB connector 42b and the Ethernet connector 42c are connected to the MODEM circuit 42a.

To constitute a communication network by use of a personal computer, the attachment plug 41a is fitted into the plug socket inside home. The information processing unit (not shown) such as the personal computer is connected to the USB connector 42b or to the Ethernet connector 42c. In other words, the USB connector for inputting/outputting data of the USB standard or the Ethernet connector for inputting/outputting data of the Ethernet standard is fitted to the information processing unit. Therefore, the USB connector of the information processing unit is connected to the USB connector 42b of the MODEM main body portion 42 through a dedicated cable (shown in the drawing), or the Ethernet connector of the information processing unit is connected to the Ethernet connector 42c of the MODEM main body portion 42 through a dedicated cable (shown in the drawing).

When data is inputted from the information processing unit to the MODEM main body portion 42 under the state described above, the MODEM circuit 42a converts the data to the analog data and overlaps it with cable 43 for supplying the D.C. voltage. The data is then sent to the interior line through the attachment plug 41a. Mutual data communication becomes thus possible with other information processing unit inside the same home. Mutual communication can also be made with other homes through a distribution line.

The PLC MODEM and the information processing unit are always used as a pair. Therefore, when no spare plug socket for using the PLC MODEM exists, a plug socket for the information processing unit to be used together must be secured. Alternatively, another plug socket for branching the plug socket must be provided.

SUMMARY OF THE INVENTION

To eliminate the problem described above, it is an object of the invention to make it possible to simultaneously use a PLC MODEM and an information processing unit by use of one plug socket inside home.

To accomplish this object, a power line communication MODEM according to the invention includes a MODEM main body portion and a power supply portion for converting an A.C. power source to a D.C. power source and supplying the D.C. power source to the MODEM main body portion through a cable, wherein the power supply portion is equipped with an attachment plug for inputting the A.C. power source and a plug socket connected to the attachment plug.

The MODEM main body portion and the power supply portion are connected to each other through a signal line. A USB connector or/and an Ethernet connector each for inputting/outputting data are fitted to the MODEM main body portion and to the power supply portion, respectively. The USB connector or/and the Ethernet connector fitted to the MODEM main body portion and the USB connector or/and the Ethernet connector fitted to the power supply portion are connected to one another through the signal line.

A modular jack is fitted to the power supply portion and terminals of the modular jack are connected to the attachment plug through signal overlapping means.

A power line communication MODEM according to the invention includes a rectification circuit for converting an A.C. power source to a D.C. power source, a MODEM circuit for receiving the supply of a D.C. voltage from the rectification circuit and a case for accommodating the rectification circuit and the MODEM circuit, wherein an attachment plug for inputting the A.C. power source and a plug socket for fitting another attachment plug, connected to the attachment plug, are fitted to the case.

At least one or more each of USB connector or/and Ethernet connector connected to the MODEM circuit is fitted to the case.

A modular jack is fitted to the case and terminals of the modular jack are connected to the attachment plug through signal overlapping means.

DESCRIPTION OF THE PREFERRED EMBODIMENTS

Figure 1:
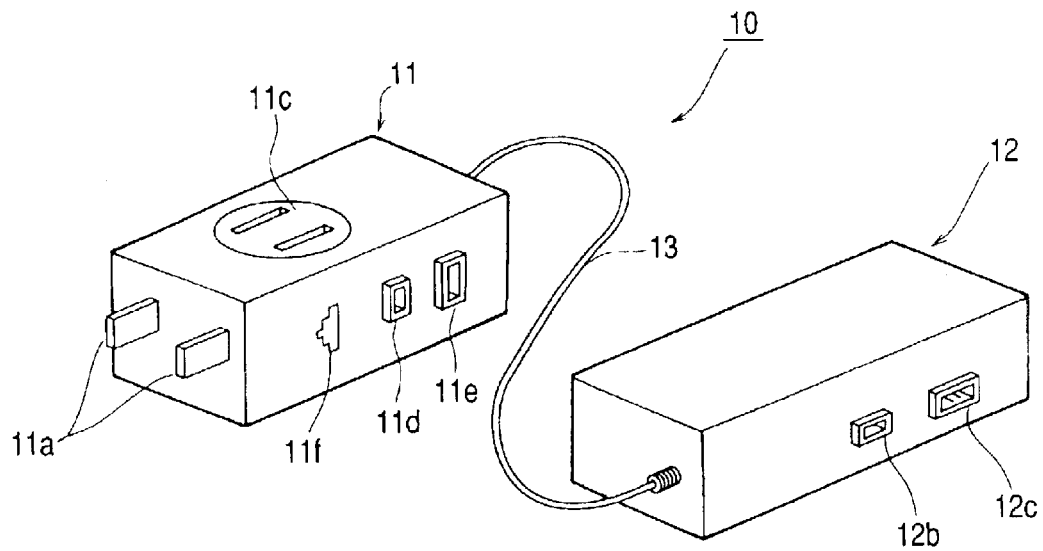
FIG. 1 is a perspective view of a power line communication MODEM according to a first embodiment of the invention.
Figure 2:
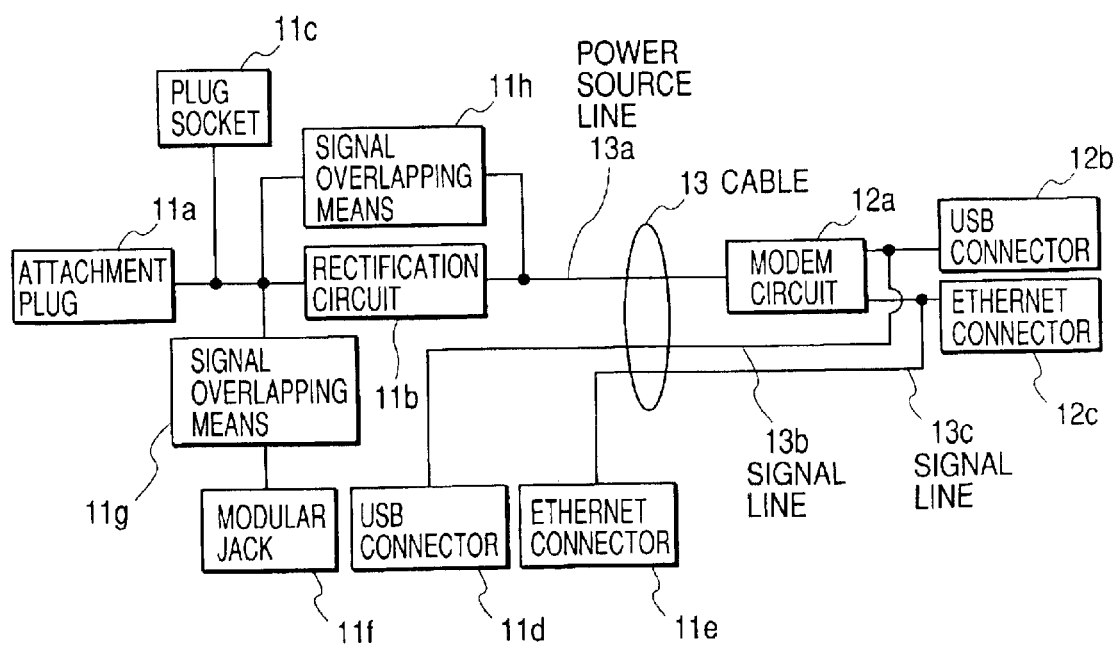
FIG. 2 is a structural circuit diagram of the power line communication MODEM according to the first embodiment of the invention.

FIG. 1 is a perspective view showing a PLC MODEM according to a first embodiment of the invention and FIG. 2 is its structural circuit diagram. Referring to FIGS. 1 and 2, a power supply portion 11 of the PLC MODEM 10 and a MODEM main body portion 12 are connected to each other by a cable 13. The power supply portion 11 has a rectangular outer shape. The power supply portion 11 converts an A.C. commercial power source to a D.C, and supplies a D.C. voltage to the MODEM main body portion 12. Therefore, the power supply portion 11 has a pair of attachment plugs 11a on one of its surfaces (such as a side surface) for inputting the A.C. power source, and incorporates therein a rectification circuit 11b.

A plug socket (power feed port) 11c connected internally to the attachment plug 11a is disposed on another surface (such as an upper surface) of the power supply portion 11. A connector for exchanging data with an external information processing unit (such as a personal computer, not shown) is disposed on still another surface (such as the other side surface) of the power source portion 11. The connector to be fitted includes a connector of the USB standard (called "USB connector") 11d, a connector of the Ethernet standard (called "Ethernet connector") 11e and a modular jack 11f used in a subscriber telephone system. Terminals of the modular jack 11f among them are connected radio frequency-wise to the attachment plugs 11a by signal overlapping means 11g.

The cable 13 for connecting the power supply portion 11 and the MODEM main body portion 12 has a plurality of lines. A power source line 13a inside the cable 13 supplies the D.C. voltage obtained by the rectification circuit 11b to the MODEM main body portion 12. The power source line 13a is connected to the attachment plug 11a by signal overlapping means 11h. The USB connector 11d and the Ethernet connector 11e are respectively connected to the MODEM main body portion 12 through signal lines 13b and 13c inside the cable 13.

The MODEM main body portion 12, too, has a rectangular outer shape and incorporates there in an MODEM circuit 12a. The MODEM circuit 12a receives the supply of the D.C. voltage from the power source line 13a and converts a digital signal to an analog signal and vice versa. A connector for exchanging digital data with an external information processing unit is provided to one of the side surfaces of the MODEM main body portion 12. The connector fitted includes the USB connector 12b and the Ethernet connector 12c. The signal line 13b connects the USB connector 11d of the power supply portion 11 to the USB connector 12b of the MODEM main body portion 2, and the signal line 13c connects the Ethernet connector 11e of the power supply portion 11 to the Ethernet connector 12c of the MODEM main body portion 2.

To constitute a communication network by use of the information processing unit, the attachment plug 11a is fitted into a plug socket inside home. The power attachment plug of the external information processing unit is fitted into the plug socket 11c of the power supply portion 11. The data input/output connector of the information processing unit is connected to the USB connector 12b or to the Ethernet connector 12c. In other words, because the USB connector for inputting/outputting data of the USB standard or the Ethernet connector for inputting/outputting data of the Ethernet standard is fitted to the information processing unit such as the personal computer, the USB connector of the information processing unit and the USB connector 12b of the MODEM main body portion 12 are connected to each other through a dedicated cable (shown in the drawing), or the Ethernet connector of the information processing unit and the Ethernet connector 12c of the MODEM main body portion 12 are connected to each other through a dedicated cable (shown in the drawing).

In the construction described above, the power source can be supplied when the attachment plug of the information processing unit is fitted into the plug socket 11c of the power supply portion 11. Therefore, lack of the plug socket can be eliminated. When the data is inputted from the information processing unit to the MODEM main body portion 12 through the cable, the MODEM circuit 12a converts the data to the analog data, and the analog signal is overlapped with the power source line 13a for supplying the D.C. voltage. The data is sent to the interior wiring through the attachment plug 11a. Mutual data communication becomes thus possible with other information processing unit inside the same home. Mutual data communication can be also made with the information processing unit in other home through a distribution line.

When the modular jack 11f of the power supply portion 11 is connected to the modular jack of the information processing unit, mutual data communication can be similarly made with other information processing unit.

To simultaneously use other information processing unit, it is necessary to connect the USB connector of other information processing unit to the USB connector 11d of the power supply portion 11, or to connect the Ethernet connector of other information processing unit to the Ethernet connector 11e of the power supply portion 11.

Incidentally, the plug socket 11c and the connectors 11d, 11e and 11f may be fitted to suitable positions of the surface other than the surface to which the attachment plug 11a is fitted.

Figure 3:
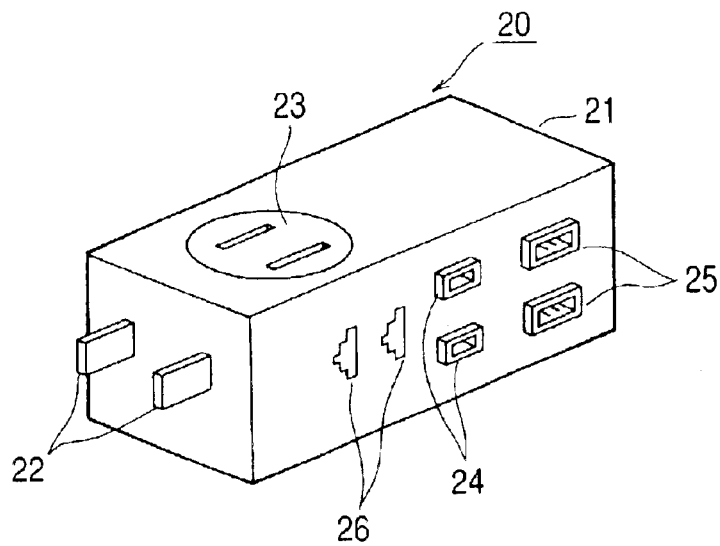
FIG. 3 is a perspective view of a power line communication MODEM according to a second embodiment of the invention.
Figure 4:
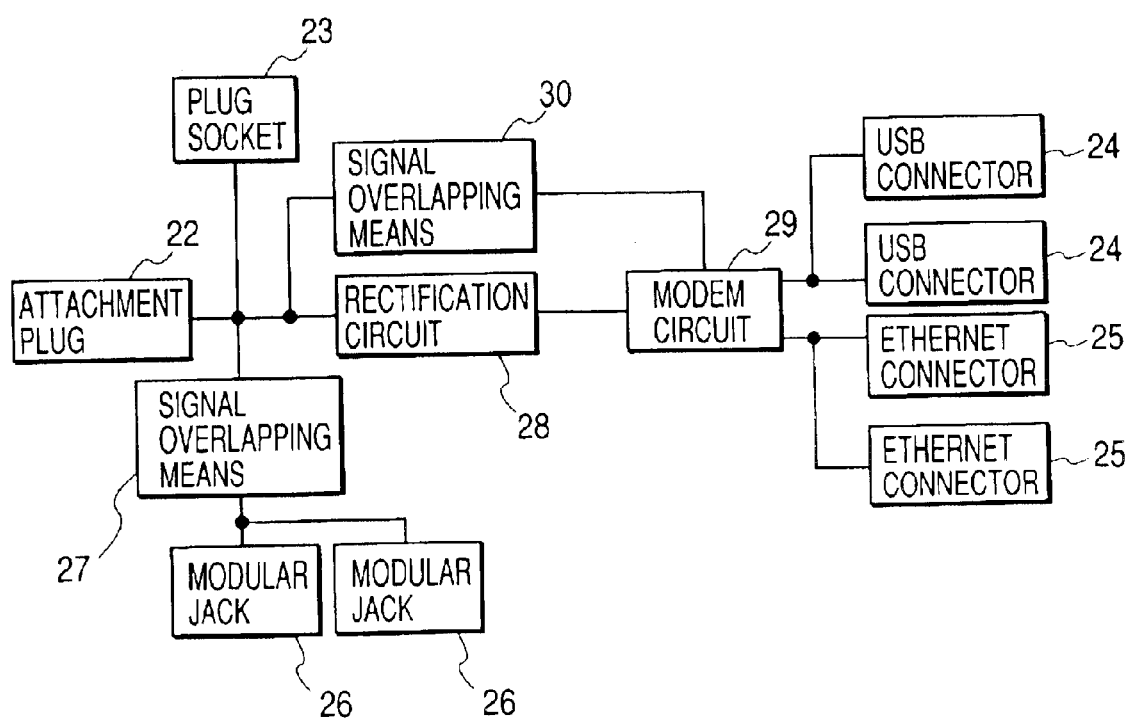
FIG. 4 is a structural circuit diagram of the power line communication MODEM according to the second embodiment of the invention.
Figure 5:
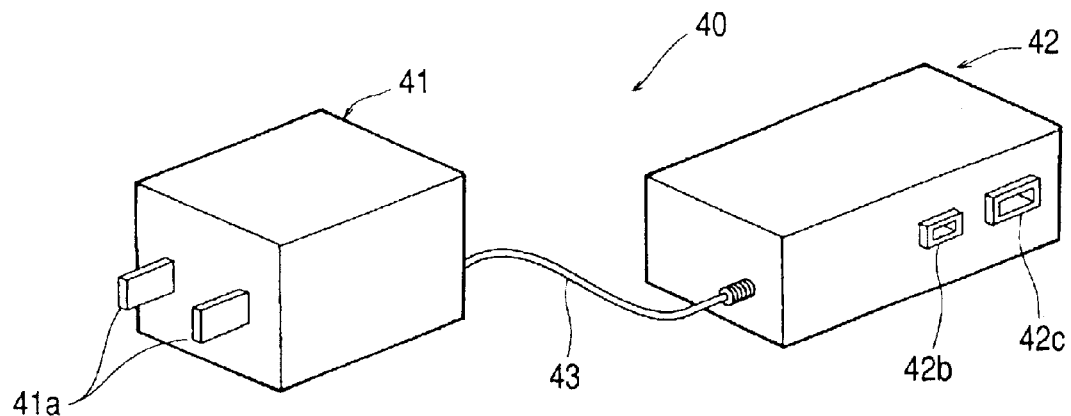
FIG. 5 is a perspective view of a known power line communication MODEM.
Figure 6:
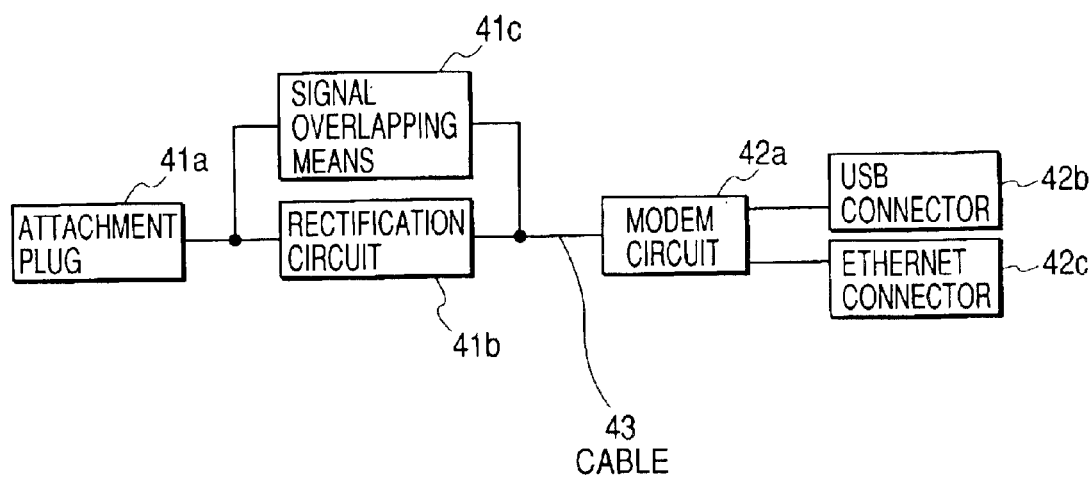
FIG. 6 is a structural circuit diagram of the known power line communication MODEM.

FIGS. 3 and 4 show a power line communication MODEM according to a second embodiment of the invention. FIG. 3 is a perspective view and FIG. 4 is a structural circuit diagram. Referring to FIGS. 3 and 4, the PCL MODEM 20 has a rectangular shape. A pair of attachment plugs 22 for inputting an A.C. power source is fitted to one of the surfaces (such as a side surface) of a case 21. A plug socket 23 internally connected to the attachment plugs 22 is disposed on other surface (such as an upper surface). A plurality each (two each in the drawing) of USB connectors 24, Ethernet connectors 25 and modular jacks 26 are fitted to other surface (the other side surface). Terminals of the modular jacks 26 are connected to the attachment plugs 22 through signal overlapping means 27.

A rectification circuit 28 for converting an A.C. power source to a D.C. and a MODEM circuit 29 for converting a digital signal to an analog signal and vice versa are disposed inside the case 21. A D.C. voltage is supplied from the rectification circuit 28 to the MODEM circuit 29. The MODEM circuit 29 and the attachment plugs 22 are connected to one another through signal overlapping means 30.

To constitute a communication network, the attachment plug 22 is fitted into a plug socket inside home. The power attachment plug of the external information processing unit is fitted into the plug socket 23. The USB connector of the external information processing unit is connected to the USB connector 24 of the PLC MODEM 20 through a dedicated cable (shown in the drawing) or the Ethernet connector of the information processing unit is connected to the Ethernet connector 25 of the PLC MODEM 20 through a dedicated cable (shown in the drawing). An additional connector may be used to use other information processing unit.

In the construction described above, since the rectification circuit 28 for supplying power and the MODEM circuit 29 are accommodated inside the same case 21, the PLC MODEM becomes compact in size. The cable for supplying the D.C. voltage becomes unnecessary.

As explained above, the power line communication MODEM according to the invention includes the MODEM main body portion and the power supply portion for converting the A.C. power source to the D.C. and supplying the D.C. power source to the MODEM main body portion through the cable. Since this power line communication MODEM further includes the attachment plugs for inputting the A.C. power source and the plug socket connected to the attachment plug in the power supply portion, the power source can be supplied from the plug socket to the information processing unit such as the personal computer used with the power line communication MODEM. Therefore, an extra plug socket is not necessary.

The MODEM main body portion and the power supply portion are connected through the signal lines, the USB connector and/or the Ethernet connector each for inputting/outputting data are fitted to the MODEM main body portion and to the power supply portion, and the USB connector or/and the Ethernet connector fitted to the MODEM main body portion and the USB connector or/and the Ethernet connector fitted to the power supply portion are connected to one another through the signal lines. Therefore, two information processing units can be used simultaneously.

The modular jack is fitted to the power supply portion and the terminals of the modular jack are connected to the attachment plugs through the signal overlapping means. Therefore, the analog signal from the information processing unit can be overlapped with the power line.

The power line communication MODEM according to the invention includes the rectification circuit for converting the A.C. power source to the D.C. power source, the MODEM circuit to which the D.C. voltage from the rectification circuit is supplied, and the case for accommodating the rectification circuit and the MODEM circuit. The attachment plugs for inputting the A.C. power source and the plug socket for fitting other attachment plug, connected to the attachment plug, are fitted to the case. Therefore, the cable for supplying the D.C. voltage to the MODEM circuit becomes unnecessary, and the MODEM becomes compact in scale.

One or more USB connector or/and Ethernet connector each for inputting/outputting data, connected to the MODEM circuit, are fitted to the case. Therefore, connection with the information processing unit can be easily established.

The modular jack is fitted to the case and the terminals of the modular jack are connected to the attachment plugs through the signal overlapping means. Therefore, the analog signals from the information processing unit can be overlapped with the power line.

What is claimed is:

1. A power line communication MODEM including:
   a MODEM main body portion;
   a power supply portion that converts an A.C. power source to a D.C. power source and supplies the D.C. power source to said MODEM main body portion through a cable; and
   an attachment plug that inputs said A.C. power source and a plug socket connected to said attachment plug, each being provided to said power supply portion;
   wherein said MODEM main body portion and said power supply portion are connected through signal lines, one of a USB connector and an Ethernet connector, each to input/output data, are fitted to said MODEM main body portion and to said power supply portion, respectively, and one of said USB connector and said Ethernet connector fitted to said MODEM main body portion are connected to one of said USB connector and said Ethernet connector fitted to said power source portion through said signal lines.

2. A power line communication MODEM according to claim 1, wherein a modular jack is fitted to said power supply portion and terminals of said modular jack are connected to said attachment plug by signal overlapping means.

* * * * *

UNITED STATES PATENT AND TRADEMARK OFFICE
CERTIFICATE OF CORRECTION

PATENT NO. : 6,867,689 B2
DATED : March 15, 2005
INVENTOR(S) : Kenichi Yokoo

It is certified that error appears in the above-identified patent and that said Letters Patent is hereby corrected as shown below:

<u>Title page, Item [54] and Column 1, line 1,</u>
Title, delete "MODERN" and substitute -- MODEM -- in its place.

Signed and Sealed this

Sixteenth Day of August, 2005

JON W. DUDAS
*Director of the United States Patent and Trademark Office*